(12) United States Patent
Muras et al.

(10) Patent No.: US 8,346,761 B2
(45) Date of Patent: Jan. 1, 2013

(54) METHOD AND SYSTEM FOR DATA MINING FOR AUTOMATIC QUERY OPTIMIZATION

(75) Inventors: Brian Robert Muras, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 2291 days.

(21) Appl. No.: 10/911,849

(22) Filed: Aug. 5, 2004

(65) Prior Publication Data

US 2006/0031189 A1  Feb. 9, 2006

(51) Int. Cl.
*G06F 15/16* (2006.01)
*G06F 17/20* (2006.01)
(52) U.S. Cl. ........................................ 707/721; 707/718
(58) Field of Classification Search ........................ None
See application file for complete search history.

(56) References Cited

U.S. PATENT DOCUMENTS

| 6,360,214 | B1 * | 3/2002 | Ellis et al. ......................... 707/2 |
| 2002/0198867 | A1 * | 12/2002 | Lohman et al. .................... 707/3 |
| 2005/0065928 | A1 * | 3/2005 | Mortensen et al. ............... 707/5 |
| 2005/0177557 | A1 * | 8/2005 | Ziauddin et al. .................. 707/3 |

* cited by examiner

*Primary Examiner* — Jean M Corrielus
*Assistant Examiner* — Alex Gofman
(74) *Attorney, Agent, or Firm* — Wood, Herron & Evans, LLP

(57) ABSTRACT

A database monitor tracks performance statistics and information about the execution of different SQL statements. A query optimizer benefits from these statistics when generating an access plan. In particular, the query optimizer, upon receiving an SQL statement, searches the records of the database monitor for similar SQL statements that have previously been executed. As part of determining the best access plan for the current SQL statement, the query optimizer considers the information retrieved from the database monitor. In this way, the access plan that is generated can automatically be tuned based on empirical performance evidence.

4 Claims, 5 Drawing Sheets

METHOD AND SYSTEM FOR DATA MINING FOR AUTOMATIC QUERY OPTIMIZATION

FIELD OF THE INVENTION

The invention relates to database management systems, and in particular, to query optimizers.

BACKGROUND OF THE INVENTION

Databases are used to store information for an innumerable number of applications, including various commercial, industrial, technical, scientific and educational applications. As the reliance on information increases, both the volume of information stored in most databases, as well as the number of users wishing to access that information, likewise increases. Moreover, as the volume of information in a database, and the number of users wishing to access the database, increases, the amount of computing resources required to manage such a database increases as well.

Database management systems (DBMS's), which are the computer programs that are used to access the information stored in databases, therefore often require tremendous resources to handle the heavy workloads placed on such systems. As such, significant resources have been devoted to increasing the performance of database management systems with respect to processing searches, or queries, to databases.

Improvements to both computer hardware and software have improved the capacities of conventional database management systems. For example, in the hardware realm, increases in microprocessor performance, coupled with improved memory management systems, have improved the number of queries that a particular microprocessor can perform in a given unit of time. Furthermore, the use of multiple microprocessors and/or multiple networked computers has further increased the capacities of many database management systems.

From a software standpoint, the use of relational databases, which organize information into formally-defined tables consisting of rows and columns, and which are typically accessed using a standardized language such as Structured Query Language (SQL), has substantially improved processing efficiency, as well as substantially simplified the creation, organization, and extension of information within a database. Furthermore, significant development efforts have been directed toward query "optimization", whereby the execution of particular searches, or queries, is optimized in an automated manner to minimize the amount of resources required to execute each query.

Through the incorporation of various hardware and software improvements, many high performance database management systems are able to handle hundreds or even thousands of queries each second, even on databases containing millions or billions of records. However, further increases in information volume and workload are inevitable, so continued advancements in database management systems are still required.

One area that has been a fertile area for academic and corporate research is that of improving the designs of the query optimizers utilized in many conventional database management systems. The primary task of a query optimizer is to choose the most efficient way to execute each database query, or request, passed to the database management system by a user. The output of an optimization process is typically referred to as an "execution plan," "access plan," or just "plan" and is frequently depicted as a tree graph. Such a plan typically incorporates (often in a proprietary form unique to each optimizer/DBMS) low-level information telling the database engine that ultimately handles a query precisely what steps to take (and in what order) to execute the query. Also typically associated with each generated plan is an optimizer's estimate of how long it will take to run the query using that plan.

An optimizer's job is often necessary and difficult because of the enormous number (i.e., "countably infinite" number) of possible query forms that can be generated in a database management system, e.g., due to factors such as the use of SQL queries with any number of relational tables made up of countless data columns of various types, the theoretically infinite number of methods of accessing the actual data records from each table referenced (e.g., using an index, a hash table, etc.), the possible combinations of those methods of access among all the tables referenced, etc. An optimizer is often permitted to rewrite a query (or portion of it) into any equivalent form, and since for any given query there are typically many equivalent forms, an optimizer has a countably infinite universe of extremely diverse possible solutions (plans) to consider. On the other hand, an optimizer is often required to use minimal system resources given the desirability for high throughput. As such, an optimizer often has only a limited amount of time to pare the search space of possible execution plans down to an optimal plan for a particular query.

Another automated tool that is a part of many database management systems is a database monitor. It is used to gather performance statistics related to SQL queries run within the database management system. The data collected by the database monitor is typically collected in a database file itself where it can be queried by a trained user to help identify and tune performance problem areas. A database monitor typically tracks the name of a query, the name of the tables accessed by the query, the indices used by the query (if any), the join parameters of the query, and other pertinent information such as the duration of time the query took to complete. The performance statistics collected by a database monitor are typically large in volume and require a knowledgeable SQL administrator to interpret and use.

Typical query optimizers store information about previously encountered queries and the access plans that were created for such queries. When a previous query is once again encountered, these optimizers use previous access plans to avoid the time and cost of re-creating an access plan regardless of how the earlier access plan performed. Thus, the current determination and analysis by the optimizer to re-use a plan simply considers whether a similar access plan is available for use and does not consider the past performance statistics of that plan such as those that are collected by a database monitor. Thus, there remains the need in prior database environments for a system that permits selecting or modifying a query access plan based on empirical evidence about the performance statistics of previously executed access plans that were collected by a database monitor.

SUMMARY OF THE INVENTION

Embodiments of the present invention relate to a database monitor that tracks performance statistics and information about the execution of different database queries and a query optimizer that benefits from these statistics when generating an access plan. In particular, the query optimizer, upon receiving a database query, searches a database of performance statistics for similar database queries that have previously been executed. As part of determining the best access plan for the current database query, the query optimizer considers the information retrieved from the statistics database. In this way, the access plan that is generated can automatically be tuned based on empirical evidence of past performance.

One aspect of the present invention relates to a method for generating an access plan. In accordance with this method, a particular set of past performance statistics is identified that relates to a database query. When the query optimizer generates an access plan for the current database query, its generation is based at least in part on the particular set of past performance statistics.

Another aspect of the present invention relates to another method for generating an access plan in which a respective set of past performance statistics is maintained for each of a plurality of previously executed database queries. From these statistics, a particular set of past performance statistics is identified corresponding to a previously executed database query similar to a current database query and the performance of an access plan identified within the particular set of past performance statistics is analyzed. The query optimizer generates a current access plan for the current database query based at least in part on the access plan that was analyzed.

Yet another aspect of the present invention relates to another method for generating an access plan that also includes a respective set of past performance statistics being maintained for each of a plurality of previously executed database queries. A current access plan for a current database query is identified and then, from the statistics, a particular set of past performance statistics is identified corresponding to a previously executed database query that used the current access plan. The performance of the previously executed database query is analyzed and used to determine whether to re-use the current access plan.

Still another aspect of the present invention relates to a method for generating an access plan that includes maintaining in non-volatile memory a respective set of past performance statistics for each of a plurality of previously executed database queries. A set of host variables references is identified within those respective sets of past performance statistics that relate to data skew performance degradation. The query optimizer forces re-optimization to generate a new access plan for the current database query if the current database query includes one or more host variables within the identified set of host variables.

DETAILED DESCRIPTION

As mentioned above, the embodiments discussed hereinafter utilize a database engine and optimizer framework that support selecting an access plan based on previously collected performance statistics of similar access plans that have previously executed. Instead of merely relying on estimated costs for the different access plan strategies, the query optimizer uses the empirical evidence from previous query executions when determining how to generate the access plan. A specific implementation of such a database engine and optimizer framework capable of supporting this functionality in a manner consistent with the invention will be discussed in greater detail below. However, prior to a discussion of such a specific implementation, a brief discussion will be provided regarding an exemplary hardware and software environment within which such an optimizer framework may reside.

Figure 1:
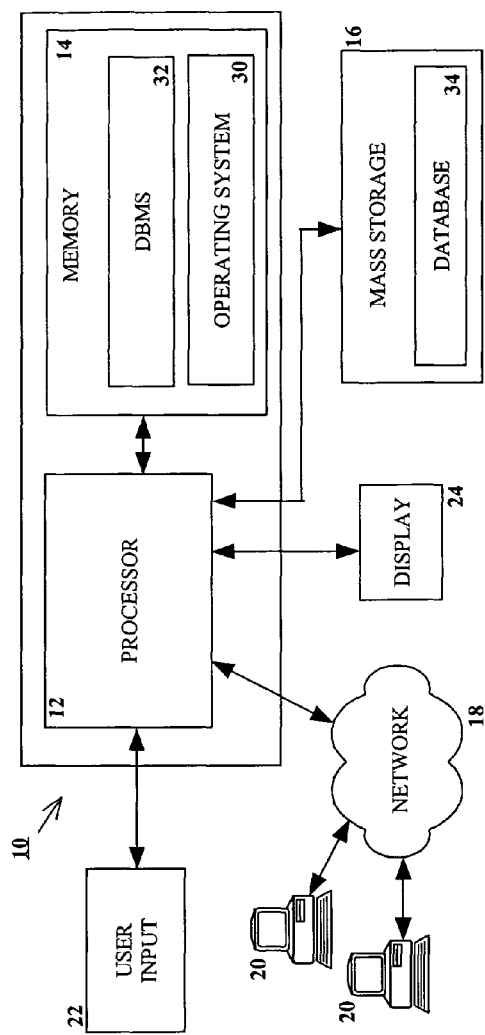
FIG. 1 is a block diagram of a networked computer system incorporating a database management system consistent with the invention.

Turning now to the Drawings, wherein like numbers denote like parts throughout the several views, FIG. 1 illustrates an exemplary hardware and software environment for an apparatus 10 suitable for implementing a database management system that considers previous performance statistics when selecting access plans consistent with the invention. For the purposes of the invention, apparatus 10 may represent practically any type of computer, computer system or other programmable electronic device, including a client computer, a server computer, a portable computer, a handheld computer, an embedded controller, etc. Moreover, apparatus 10 may be implemented using one or more networked computers, e.g., in a cluster or other distributed computing system. Apparatus 10 will hereinafter also be referred to as a "computer", although it should be appreciated the term "apparatus" may also include other suitable programmable electronic devices consistent with the invention.

Computer 10 typically includes at least one processor 12 coupled to a memory 14. Processor 12 may represent one or more processors (e.g., microprocessors), and memory 14 may represent the random access memory (RAM) devices comprising the main storage of computer 10, as well as any supplemental levels of memory, e.g., cache memories, non-volatile or backup memories (e.g., programmable or flash memories), read-only memories, etc. In addition, memory 14 may be considered to include memory storage physically located elsewhere in computer 10, e.g., any cache memory in a processor 12, as well as any storage capacity used as a virtual memory, e.g., as stored on a mass storage device 16 or on another computer coupled to computer 10 via network 18 (e.g., a client computer 20).

Computer 10 also typically receives a number of inputs and outputs for communicating information externally. For interface with a user or operator, computer 10 typically includes one or more user input devices 22 (e.g., a keyboard, a mouse, a trackball, a joystick, a touchpad, and/or a microphone, among others) and a display 24 (e.g., a CRT monitor, an LCD display panel, and/or a speaker, among others). Otherwise, user input may be received via another computer (e.g., a computer 20) interfaced with computer 10 over network 18, or via a dedicated workstation interface or the like.

For additional storage, computer 10 may also include one or more mass storage devices 16, e.g., a floppy or other removable disk drive, a hard disk drive, a direct access storage device (DASD), an optical drive (e.g., a CD drive, a DVD drive, etc.), and/or a tape drive, among others. Furthermore, computer 10 may include an interface with one or more networks 18 (e.g., a LAN, a WAN, a wireless network, and/or the Internet, among others) to permit the communication of information with other computers coupled to the network. It should be appreciated that computer 10 typically includes suitable analog and/or digital interfaces between processor 12 and each of components 14, 16, 18, 22 and 24 as is well known in the art.

Computer 10 operates under the control of an operating system 30, and executes or otherwise relies upon various computer software applications, components, programs, objects, modules, data structures, etc. (e.g., database management system 32 and database 34, among others). Moreover, various applications, components, programs, objects, modules, etc. may also execute on one or more processors in another computer coupled to computer 10 via a network 18, e.g., in a distributed or client-server computing environment, whereby the processing required to implement the functions of a computer program may be allocated to multiple computers over a network.

Figure 2:
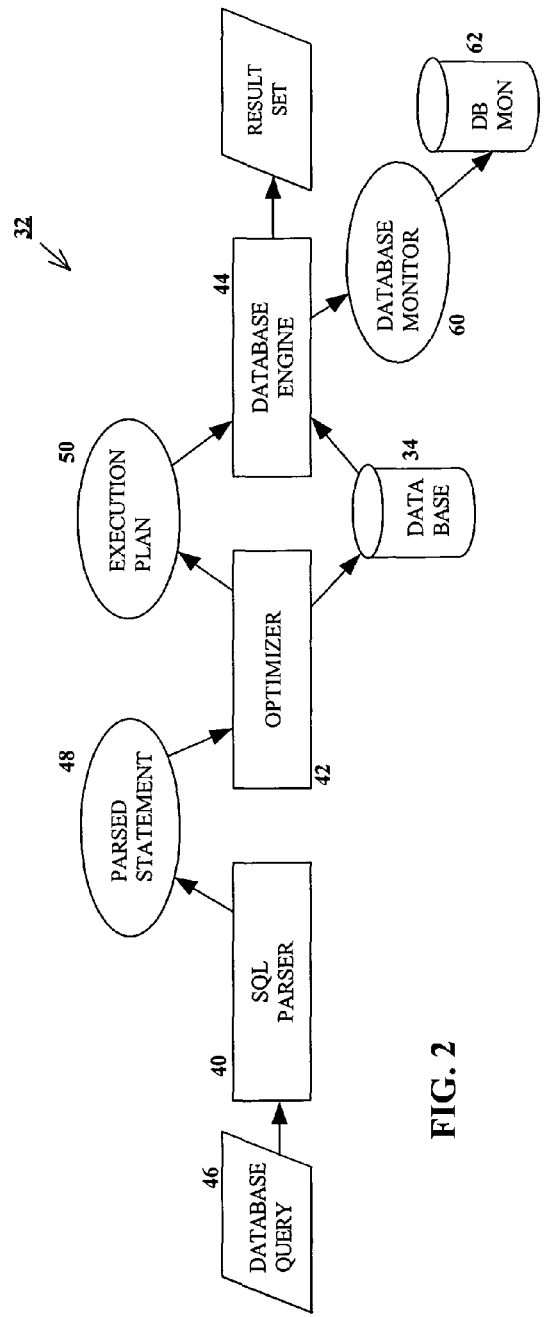
FIG. 2 is a block diagram illustrating the principal components and flow of information therebetween in the database management system of FIG. 1.

Turning briefly to FIG. 2, an exemplary implementation of database management system 32 is shown. The principal components of database management system 32 that are relevant to query optimization are an SQL parser 40, cost-based optimizer 42 and database engine 44. SQL parser 40 receives from a user a database query 46, which in the illustrated embodiment, is provided in the form of an SQL statement. SQL parser 40 then generates a parsed statement 48 therefrom, which is passed to optimizer 42 for query optimization. As a result of query optimization, an execution or access plan 50 is generated, often using data such as platform capabilities, query content information, etc., that is stored in database 34. Once generated, the execution plan is forwarded to database engine 44 for execution of the database query on the information in database 34. The result of the execution of the database query is typically stored in a result set, as represented at block 52.

While the database engine 44 executes the query 46, a database monitor 60 tracks performance of the execution and collects statistics and other information about how the plan 50 is performing. The statistics and information for each query 46 are stored in a monitor database 62. The database monitor 62 is advantageously a relational database that permits easy searching and retrieval of data.

Other components may be incorporated into system 32, as may other suitable database management architectures. Other database programming and organizational architectures may also be used consistent with the invention. Therefore, the invention is not limited to the particular implementation discussed herein.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIGS. 1 and 2 is not intended to limit the present invention. Indeed, those skilled in the art will recognize that other alternative hardware and/or software environments may be used without departing from the scope of the invention.

Query optimizers have added great benefits to automatic operation of database management systems. These optimizers have allowed different access plan strategies to be quickly explored so that an optimal strategy can be identified and selected to perform an SQL statement. In addition, there are a number of database monitoring tools available to collect statistics about queries as they execute. However, these statistics have typically been useful only to skilled administrators who can interpret the statistics and use them to help tune a database. Embodiments of the present invention contemplate using the data collected by database monitoring tools to automatically allow a database to tune itself by permitting the query optimizer to utilize the performance statistics collected when generating a query access plan. Typical query optimizers have relatively robust performance and successfully choose an optimal access plan the majority of the time; however, in certain instances, the query optimizer may have difficulty in selecting the best access plan. For example, the more complex the WHERE clause that filters the selection of rows of a table, the more difficulty the query optimizer has in selecting the best access plan. Also, when multiple files (or tables) are involved in a query, an optimizer may have difficulty in selecting an efficient access plan. By using past performance statistics about how a similar access plan actually performed, the query optimizer may be prevented from selecting a poor performing access plan that otherwise appears to be the optimal plan.

The type of data that can be collected by a database monitor is large and varied. The exemplary embodiments described herein provide specific examples of performance statistics that may be used to affect which access plan an optimizer selects. However, the present invention also contemplates using other specific performance statistics to assist the query optimizer. Commonly used performance statistics include file size, memory size, processor speed, number of processors available, the SQL statement (with parameters replaced), type of SQL operation, number of row updated, inserted, or deleted, number of rows fetched, elapsed time for this operation, access plan rebuild code, table name, join fields, estimated completion time, estimate I/O operations, number of rows in the table, index name, hash used, host variables, join position, join method, join type, etc.

Figure 3:
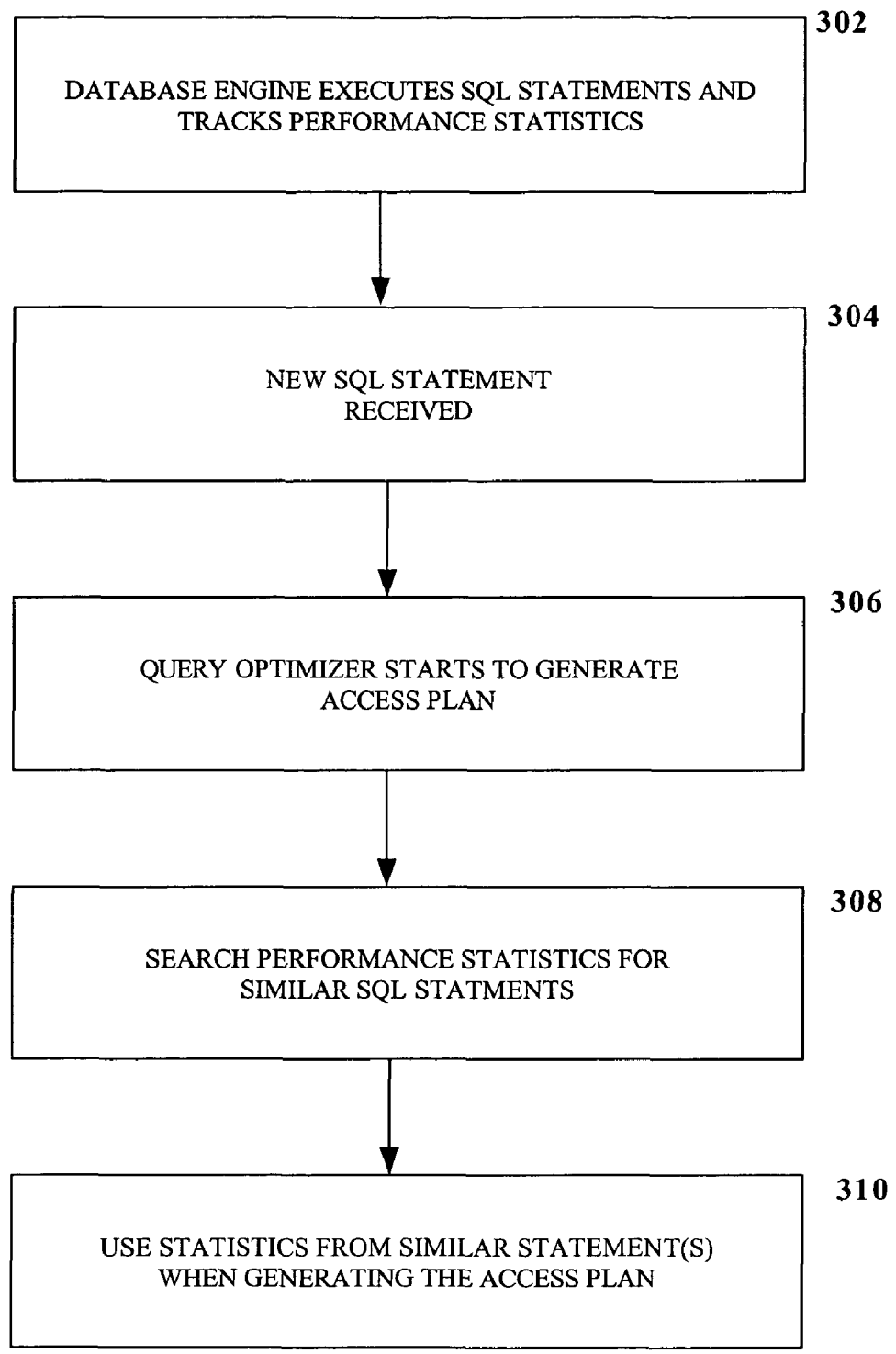
FIG. 3 illustrates a flowchart of an exemplary method for a query optimizer to use past performance statistics when generating an access plan.

In general, FIG. 3 illustrates a flowchart of an exemplary embodiment of the present invention. In step 302, SQL statements are executed and during execution, performance statistics relating to each SQL statement are tracked and recorded. The performance statistics are maintained in a manner that is accessible by the query optimizer. When a new SQL statement is received in step 304, the query optimizer begins to generate an access plan, in step 306. As part of developing the access plan, the query optimizer searches the performance statistics, in step 308, to locate at least one similar SQL statement that was performed in the past. In step 310, the performance statistics of this statement, or more than one statement, are then used by the query optimizer when developing the access plan. The optimizer may use this information to force certain restrictions when developing an access plan or may use this information to select between different access plans that are available for the particular SQL statement.

Figure 4:
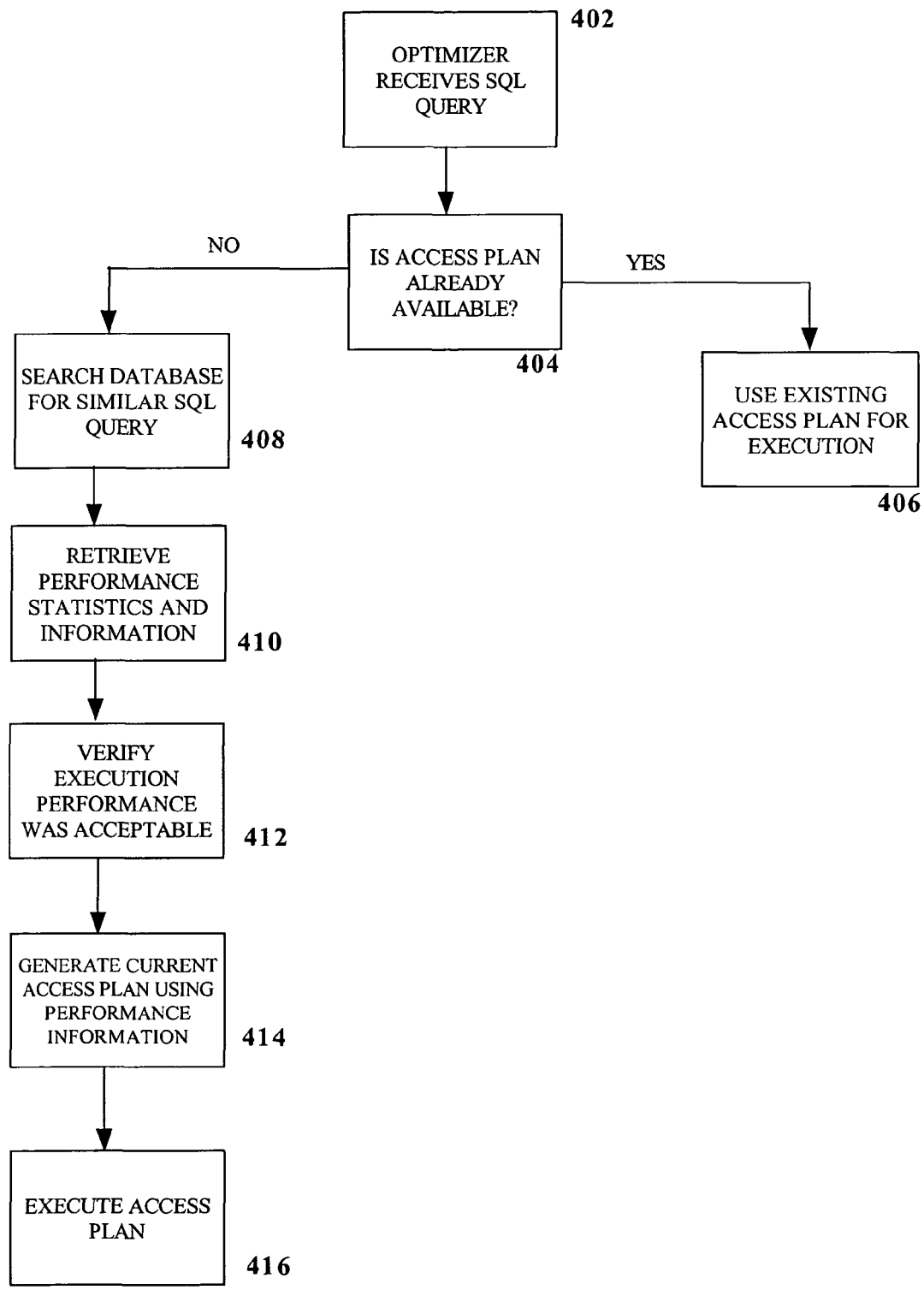
FIG. 4 illustrates a flowchart of an exemplary method of locating a similar SQL statement in a database monitor's records to use when generating an access plan.

FIG. 4 illustrates one exemplary use of certain performance statistics of the database monitor to assist the query optimizer in selecting an access plan. A query optimizer typically maintains a list of access plans that have been previously executed. Thus, when an SQL statement is encountered, the query optimizer searches its cache of plans to determine if it needs to build an access plan from scratch or whether it can re-use an access plan it has previously built. However, an access plan for a particular SQL statement may not be found in the cache if the cache acts as a FIFO buffer with limited size or if the cache is in volatile memory that exists only during the current session of the query optimizer. Similarly, during dynamic SQL operation, the query access plans are not saved as they are executed. However, the database monitor stores a non-volatile record of previously executed access plans and, therefore, provides an additional source of information for the query optimizer.

In step 402, the query optimizer identifies the SQL statement and determines, in step 404, whether an existing access plan, currently maintained by the query optimizer, is available for the query. If so, then that access plan is used, in step 406, to perform the query.

If the query optimizer can not locate a previously implemented query access plan, then it searches, in step 408, the records of the database monitor for a similar query or SQL statement. One of ordinary skill will recognize that there are a variety of ways to measure similarity between queries. The queries may be compared on their SQL syntax, their JOIN variables, their WHERE clauses, their host variables, and other characteristics. If the present SQL query is similar to a stored query, then the query optimizer retrieves other performance statistics about the stored query from the database monitor records, in step 410.

In step 412, the performance statistics of the stored query are optionally checked to verify that it performed the query as estimated or with the estimated number of I/O operations. Alternatively, the performance statistics can be used to determine the number of rows fetched as compared to the number of rows updated. This statistic may be used to determine if the SELECT clause is sufficiently filtering records acted on by the WHERE clause. The purpose of the determination in step 412 is to identify whether the access plan tracked within the database monitor is one that performed sufficiently well so as to recommend it to the query optimizer.

From the information in the database monitor records, the query optimizer can be forced, in step 414, to use certain implementations to generate an access plan (e.g., join orders, indexes, etc.) instead of generating the entire access plan from scratch. In step 416, then, this access plan is executed to implement the query.

Figure 5:
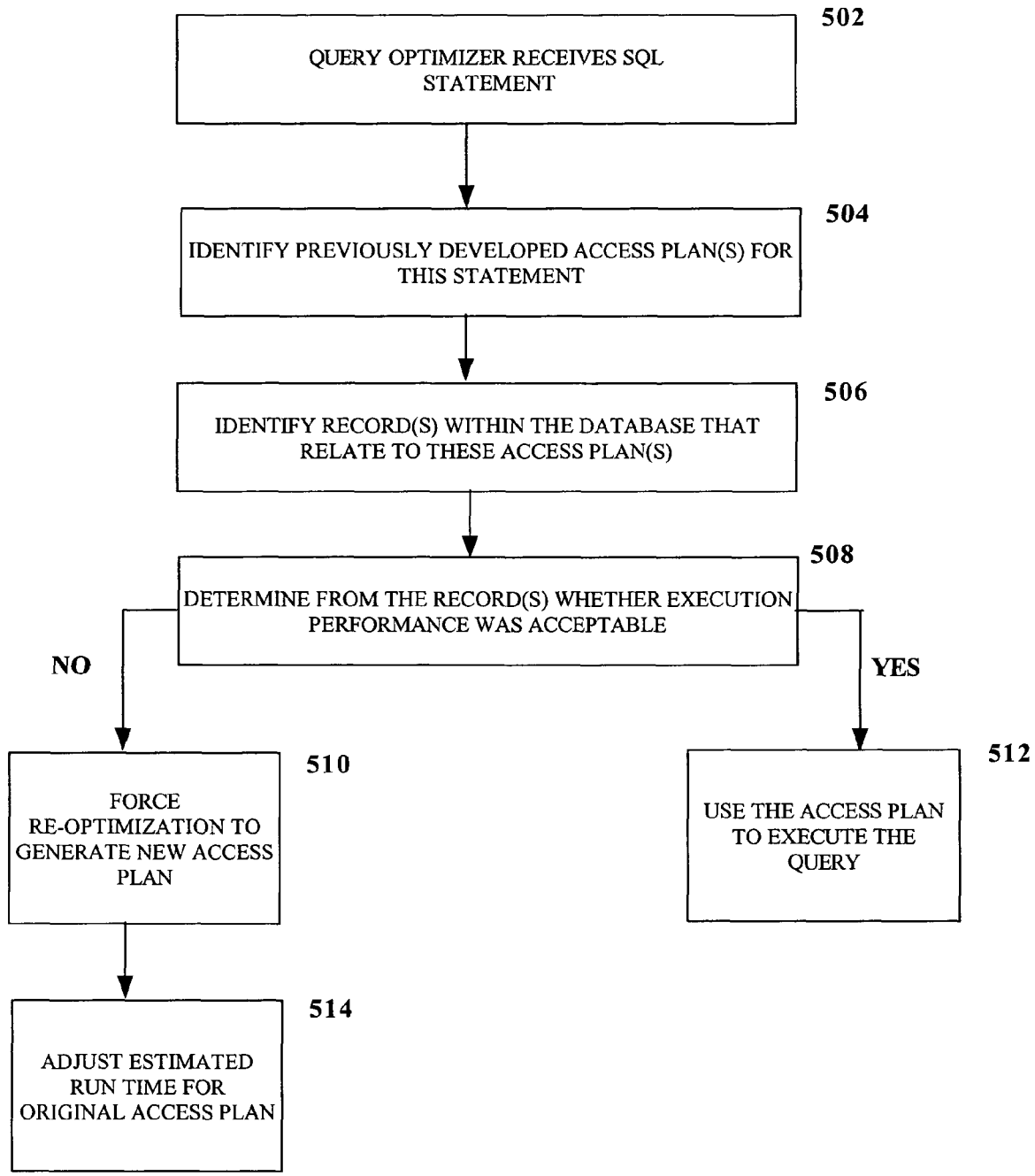
FIG. 5 illustrates a flowchart of an exemplary method for determining how to generate an access plan based on how well a similar access plan performed in the past.

FIG. 5 illustrates a flowchart of another exemplary use of performance statistics by a query optimizer in accordance with the principles of the present invention. In step 502, the query optimizer receives an SQL statement and identifies, in step 504, an access plan that had previously been used to implement this SQL statement. In step 506, the query optimizer can then search for a record in the database monitor of a previous SQL statement that also used this access plan. From this record, a determination is made, in step 508, about how well the access plan performed the SQL statement. For example, the estimated I/O operations can be compared against the actual I/O operations or the estimated completion time can be compared to the actual completion time. In addition, other performance characteristics can be compared to one another to determine if the access plan performed as intended. If the performance of the access plan was below acceptable levels, then the query optimizer forces re-optimization of the access plan for this SQL statement, in step 510. If the access plan did perform adequately, then the query optimizer may implement the query plan as it stands, in step 512.

If re-optimization is selected, then the estimated run time for the original access plan may be increased, in step 514, to reflect the discovery that the previous estimated run time proved to be too short. In this way, the original access plan becomes less attractive to the query optimizer when the query optimizer is selecting from among different access plans for a particular query in the future. Even if the original access plan is selected, the query optimizer may utilize the historical records of the database monitor to learn the closest estimated run time for a particular access plan and adjust them accordingly.

Another area where empirical performance statistics can be used by a query optimizer to improve generation of an access plan is related to data skew. The physical arrangement of data on different devices affects the performance of database operations. For example, if a particular query results in accessing data that is randomly scattered over a variety of different devices, then a large portion of the I/O operations may occur in parallel. If the data to be accessed is concentrated on one or just a few devices, then I/O operations occur mainly serially and performance is degraded. Other data skew situations may exist where one particular device is especially slow such that any query plan that access that device runs much slower (e.g., 25 to 100 times) slower than average query plans. In large data warehouses, a device may be a physical device or a logical partition. For example, a device may be partition that is striped across multiple physical drives. Data skew refers to the general condition in which the physical manner in which the data is stored adversely affects the performance of performing certain I/O operations.

Figure 6:
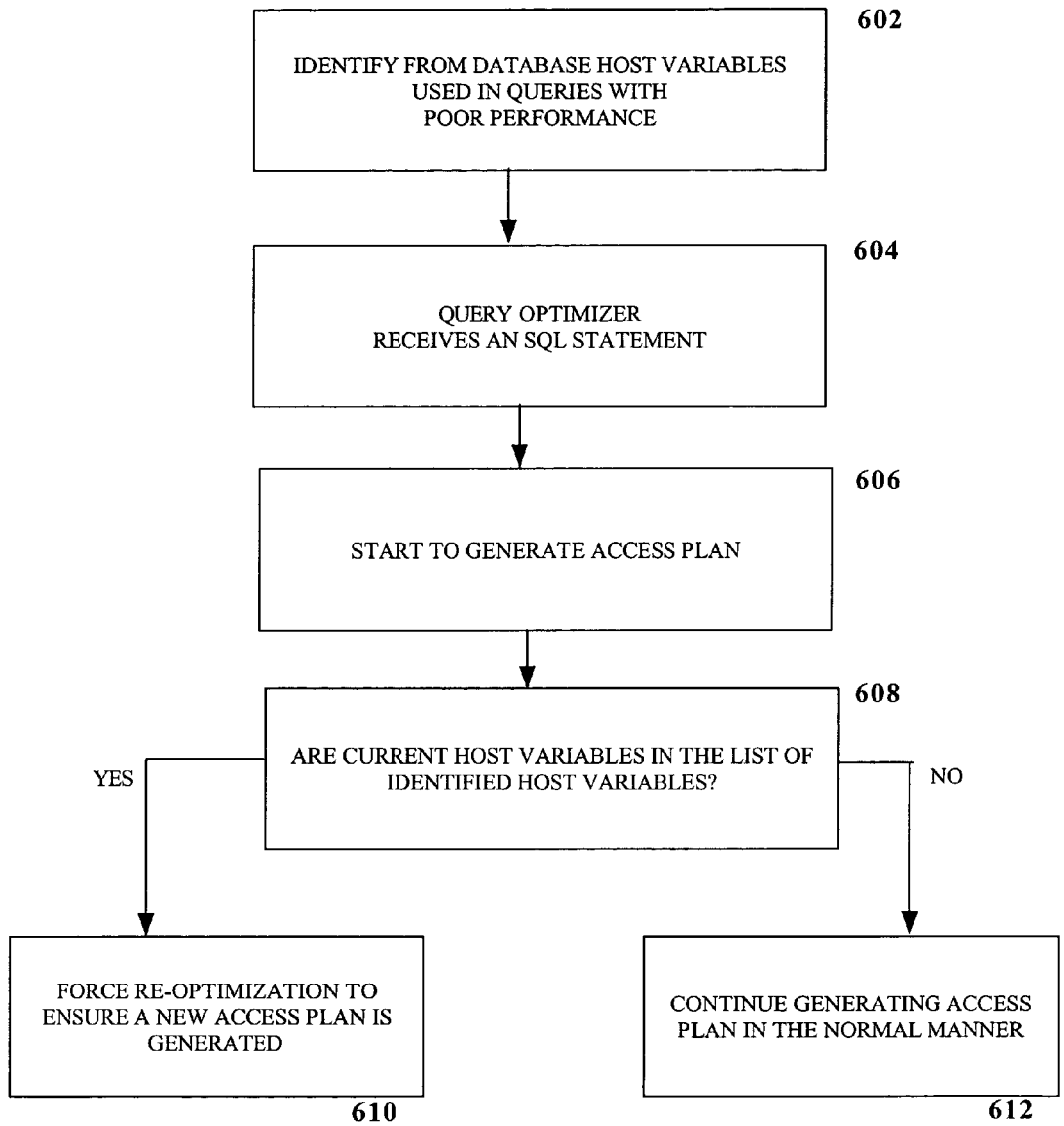
FIG. 6 illustrates a flowchart of an exemplary method for determining how to generate an access plan based on past statistics regarding data skew.

The flowchart of FIG. 6 illustrates one exemplary method for a query optimizer to consider data skew when selecting an access plan for implementing an SQL statement. In step 602, the database monitor is queried to identify which host variables are involved in query plans that executed x times slower than its estimated run time (where x may be a variety of numbers such as, but not limited to, between 25-100). These host variables are identified as host variable that involve data skew. In step 604, the query optimizer receives an SQL statement and begins generation of an access plan in step 606. As part of the generation of the access plan, the query optimizer determines, in step 608, if the current SQL statement includes one or more host variables that have been identified as involving data skew. If so, then the query optimizer can force a re-optimization in step 610 to ensure a new access plan is generated from scratch. Otherwise, a current access plan can be executed, in step 612, without re-optimization, if available.

The method described with relation to FIG. 6 is particularly useful when the database management system is operating in a mode known as reusable open data path (ODP) mode. The ODP is a data structure within an access plan that defines an active path through which data is read. In reusable ODP mode, the ODP is kept open even when the SQL query that requested the path is closed. This speeds up data access the next time the path is needed. Reusable ODP mode improves performance but is particularly susceptible to performance degradation due to data skew. Thus, if a query in reusable ODP mode references a set of host variables that have been identified as involving data skew, it is particularly advantageous to exit the reusable ODP mode and force a re-optimization of the query. If this attempt at re-optimization does not result in any improvements, then this set of host variables can be marked as especially harmful so that in the future no time or effort is wasted to force re-optimization of queries that reference this set of host variables.

Another performance statistic that is peripherally related to data skew involves information about when a table or file was re-organized. Re-organization of a file changes its physical layout on the different storage devices on which a database is implemented and implicates what index may improve file access performance. Thus, query access plans that executed before a file was re-organized may, or may not, be the best access plan to implement an SQL statement. Thus, the query optimizer, when estimating I/O operations or when evaluating estimated run times, in order to select an access plan, may also consider whether a table or file has been re-organized when determining how much weight to assign the different performance statistics.

Accordingly, a system and method has been described that permits a query optimizer to automatically consider empirical performance statistics when selecting an access plan for an SQL statement. Various modifications may be made to the illustrated embodiments without departing from the spirit and scope of the invention. Therefore, the invention lies in the claims hereinafter appended.

What is claimed is:

1. A method for generating an access plan, the method comprising the steps of:
   maintaining in non-volatile memory a respective set of past performance statistics for each of a plurality of previously executed database queries;
   identifying a set of host variables referenced within those respective sets of past performance statistics that relate to data skew performance degradation; and
   forcing re-optimization to generate and store a new access plan for a current SQL statement if the current database query includes one or more host variables within the identified set of host variables.

2. The method of claim 1, further comprising the step of:
   determining if a current database query includes one or more of the identified set of host variables.

3. The method of claim 1, wherein the step of identifying further includes the step of:
   identifying a set of host variables references within those respective sets of past performance statistics that executed slower than estimated.

4. The method of claim 3, wherein the step of identifying further includes the step of:
   identifying the set of host variables references within those respective sets of past performance statistics that executed between 25 and 100 times slower than estimated.

* * * * *